US008976733B2

(12) United States Patent
daCosta et al.

(10) Patent No.: US 8,976,733 B2
(45) Date of Patent: *Mar. 10, 2015

(54) PERSISTENT MESH FOR ISOLATED MOBILE AND TEMPORAL NETWORKING

(71) Applicant: Mesh Dynamics, Inc., Santa Clara, CA (US)

(72) Inventors: Francis daCosta, Santa Clara, CA (US); Sriram Dayanandan, Santa Clara, CA (US)

(73) Assignee: Dynamic Mesh Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,273

(22) Filed: Aug. 12, 2013

(65) Prior Publication Data

US 2013/0336216 A1 Dec. 19, 2013

Related U.S. Application Data

(63) Continuation of application No. 12/696,947, filed on Jan. 29, 2010, now Pat. No. 8,520,691, and a continuation-in-part of application No. 11/084,330, filed on Mar. 17, 2005, now abandoned, which is a (Continued)

(51) Int. Cl.
*H04W 4/00* (2009.01)
*H04W 84/10* (2009.01)

(Continued)

(52) U.S. Cl.
CPC ............ *H04W 84/10* (2013.01); *H04W 40/246* (2013.01); *H04W 84/02* (2013.01); *H04L 12/66* (2013.01); *H04L 45/04* (2013.01); *H04W 84/005* (2013.01); *H04W 84/20* (2013.01);
*H04L 45/02* (2013.01); *H04L 12/46* (2013.01);
*H04W 84/18* (2013.01); *H04L 12/2858* (2013.01); *H04W 40/248* (2013.01); *H04W 92/04* (2013.01); *H04W 92/045* (2013.01);
*H04L 41/12* (2013.01);

(Continued)

(58) Field of Classification Search
CPC ..... H04L 12/2858; H04L 12/46; H04L 12/66; H04L 41/12; H04L 45/02; H04L 45/04; H04W 8/005; H04W 40/24; H04W 40/246; H04W 40/248; H04W 84/005; H04W 84/02; H04W 84/18; H04W 84/20; H04W 84/22; H04W 92/04; H04W 92/045
USPC .......................... 370/254–256, 328, 338, 408
See application file for complete search history.

(56) References Cited

U.S. PATENT DOCUMENTS 6,046,992 A * 4/2000 Meier et al. .................... 370/338
6,912,204 B2 * 6/2005 Kossi et al. .................... 370/252

(Continued)

*Primary Examiner* — Peter Cheng
(74) *Attorney, Agent, or Firm* — Cherskov Flaynik & Gurda, LLC

(57) ABSTRACT

A structured wireless mesh network is disclosed where a tree-like connection topology is formed. In one embodiment, each node has separate uplink and downlink radios operating on different channels. When a cluster of such nodes becomes isolated as in the case of a mobile mesh application, a node in the cluster according to this invention acts as a root node thus enabling the tree structure to persist, even in isolation. Example methods of joining sub networks are disclosed that guide the joining of mesh networks and channel management. Nodes that may operate in isolation also support a distributed DHCP capability such that IP addresses are assigned to clients even when a connection to a central DHCP server is unavailable.

18 Claims, 9 Drawing Sheets

Related U.S. Application Data continuation-in-part of application No. 10/434,948, filed on May 8, 2003, now Pat. No. 7,420,952, said application No. 12/696,947 is a continuation-in-part of application No. 12/352,457, filed on Jan. 12, 2009, now Pat. No. 8,477,762.

(60) Provisional application No. 61/148,803, filed on Jan. 30, 2009.

(51) Int. Cl.
| | | |
|---|---|---|
| *H04W 40/24* | (2009.01) | |
| *H04L 12/715* | (2013.01) | |
| *H04W 84/00* | (2009.01) | |
| *H04W 84/18* | (2009.01) | |
| *H04L 12/24* | (2006.01) | |
| *H04W 8/00* | (2009.01) | |
| *H04W 84/22* | (2009.01) | |
| *H04W 84/02* | (2009.01) | |
| *H04L 12/66* | (2006.01) | |
| *H04W 84/20* | (2009.01) | |
| *H04L 12/751* | (2013.01) | |
| *H04L 12/46* | (2006.01) | |
| *H04L 12/28* | (2006.01) | |
| *H04W 92/04* | (2009.01) | |
| *H04W 40/32* | (2009.01) | |
| *H04W 88/04* | (2009.01) | |

(52) U.S. Cl.
CPC .............. *H04W40/24* (2013.01); *H04W 8/005* (2013.01); *H04W 40/32* (2013.01); *H04W 84/22* (2013.01); *H04W 88/04* (2013.01)
USPC .......................................................... 370/328

(56) References Cited

U.S. PATENT DOCUMENTS

| | | | |
|---|---|---|---|
| 7,738,402 B2* | 6/2010 | Feldman et al. | 370/254 |
| 2002/0082035 A1* | 6/2002 | Aihara et al. | 455/518 |
| 2004/0095900 A1* | 5/2004 | Siegel | 370/328 |
| 2004/0203787 A1 | 10/2004 | Naghian | |
| 2007/0204021 A1* | 8/2007 | Ekl et al. | 709/223 |
| 2008/0214175 A1* | 9/2008 | Papadoglou et al. | 455/422.1 |
| 2008/0222275 A1* | 9/2008 | Yumoto | 709/220 |

* cited by examiner

DISTRIBUTED DHCP SERVICE WITH INHERENT CONFLICT RESOLUTION

ASSUME A FIXED SUBNET MASK OF *255.0.0.0* IS USED

- IP ADDRESSES OF THE FORM *A.x.y.k* where
- A defines the *CUSTOMER-NETWORK-ID* 16 bit (0 -255)
- k is *CLIENT BASED ID* 16 bit (0-255)
- x, y are each 16 bit : $2^{32}$ unique networks each with up 255 clients possible POLICY DIRECTIVE: SPLIT UP ADDRESS SPACE BETWEEN STATIC and MOBILE networks

- Assign 15 bits to distributed DHCP services for floating networks
- Let NODES CHOOSE A RANDOM 15-bit NUMBER '*R*' AT STARTUP and
    1. LET '*M*' BE THE DECIMAL EQUIVALENT OF THE 7-MSBs OF '*R*'
    2. LET '*N*' THE DECIMAL EQUIVALENT OF THE 8-LSBs OF '*R*'

THE DHCP ADDRESS SPACE OF THE NODE WOULD BE

*A.255-M.N.0 to A.255-M.N.254 where 0<=M<=127 and 0<=N<=255*

Figure 9

PERSISTENT MESH FOR ISOLATED MOBILE AND TEMPORAL NETWORKING

CROSS REFERENCE TO RELATED APPLICATIONS

This application claims the benefit of claim priority as a continuation of U.S. application Ser. No. 12/696,947, filed on Jan. 29, 2010, currently patented as U.S. Pat. No. 8,520,691 on Aug. 27, 2013 which in turn claimed priority as a non-provisional filing of Ser. No. 61/148,803 filed on Jan. 30, 2009, and also as a continuation in part of the U.S. Utility application Ser. No. 11/084,330 filed Mar. 17, 2005, currently abandoned which in turn is a continuation-in-part of U.S. Utility application Ser. No. 10/434,948, filed on May 8, 2003, patented as U.S. Pat. No. 7,420,952 on Sep. 2, 2008. Further, the Ser. No. 12/696,947 application claimed priority as a continuation in part of the U.S. Utility application Ser. No. 12/352,457, filed on Jan. 12, 2009, currently patented as U.S. Pat. No. 8,477,762 on Jun. 12, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to wireless mesh networks and in particular mesh networks used for mobile applications where continuity of operation is critical. In particular, the invention relates to clusters of mesh nodes that may become isolated from a wired or grounded network, but where communication remains possible within the isolated cluster, resolving issues pertaining to mesh topology, channel management and address management.

2. Background of the Invention

The instant invention relates to wireless networks comprising a set of wireless access points, commonly referred to as a mesh network.

In mesh architectures, mesh nodes act as central structural elements providing means of connectivity to a broad range of client devices. In some embodiments of the invention, mesh nodes are wireless access points. Each client device communicates with an available mesh node or access point. The communication between client devices and access points may occur using any means.

A "mesh" forms when a set of access points establishes communication with one another. The communication between the access points forms the strands of an ethereal mesh. Client devices sit in the spaces between the strands and establish communication with the access points which are found at the intersections of the mesh strands.

While wireless mesh networks provide additional functionality not available using other network topologies, certain difficulties are created by wireless mesh networks described in the prior art.

A serious problem for mesh networks is created by the wireless medium used for communication within the mesh. Radio is a shared medium where only one transmission may occur on each frequency at a time. The RF spectrum is divided into frequency ranges, or channels, to allow more concurrent transmissions. However, the channels cannot be made too small so as to interfere with one another. Consequently, useable communication frequencies are generally divided into no more than a dozen channels, not all of which may be used concurrently.

In simplest mesh networks, known as ad-hoc mesh networks, all communication occurs on a single frequency or channel. In such simple networks, each access point (or AP) comprises a single radio and antenna (forming a single node) which provides communication means with client devices and other nearby mesh nodes. The benefit inherent in this mesh is that the mesh coverage may be easily increased by introducing an additional wireless access point. The sole configuration step for a simple ad-hoc mesh is the selection of the communication channel. One drawback of ad-hoc mesh is that each access point and client device contends with other access points to use the single communication frequency. Another drawback is that each access point or node in a simple ad-hoc mesh carries the entire routing table for the mesh network as a whole, and must traverse the table each time a packet arrives in order to know how to process the packet. As a result of both of these characteristics, when the size of the mesh and the distance between access points increases, performance characteristics of the network decrease dramatically.

As networks grow, each access point's basic service set (BSS) increases to the point where it can become unmanageable. The ability to subdivide the network into smaller groups is an approach to prevent scaling problems, and one approach to subdividing the network is to introduce two radios into each access point.

In a prior art dual radio mesh, as is depicted in FIG. 1(A), access points include two radios: a relay radio 120 and a client-service radio 110. The relay radio 120 operates at a first frequency, or channel ChQ 130, to perform duplex (two-way) communication between the access points forming the mesh. Within this prior art mesh, all relay radios operate on the same channel, and each access point contains the routing table for the entire mesh network. Each access point in turn provides access to one or more clients using the client-service radio 110 operating on a second frequency. Essentially, these are one radio ad-hoc mesh nodes with a client-service radio added.

This prior art system, while simple to implement, does not scale beyond a limited number of radios. Rather, throughput drops exponentially as the number of access points increases, especially in instances where downstream access points attempt to connect to an exterior network 108. In essence, the access points in this conventional mesh form the wireless equivalent of a hub. Like hubs, single radio mesh backhauls do not scale as well as multi-radio backhauls in addressing high bandwidth requirements for mission critical mesh networks, especially when the single radio solution carries the entire routing table for the mesh in each node.

In contrast with the hub-like operation of FIG. 1(A) is the wired network switch presented in FIG. 2. As shown in FIG. 2, each network switch includes uplinks 210 and one or more downlinks 220 forming a tree-like structure. The traffic within each switch comprising this conventional wired switch stack operates within specified sub-domains. Therefore, the size of any one sub domain is limited and ensures that local traffic inside a sub domain, or between multiple sub domains does not slow down the entire network. This multi-domain switch architecture is more efficient than hub configurations in that it allows for scalable networking. Contributing to this scalability is the distributed routing table methodology that is typically implemented in a conventional wired network switch. However, drawbacks exist. Namely, the prior-art switch architecture has been implemented using physical wireline connections between discrete switches and not a flexible mesh architecture employing wireless connections.

The present invention is designed to overcome the challenges inherent in the prior art solutions. In one embodiment, the instant invention is based on a two-radio mesh network, where each mesh node includes one radio for the uplink backhaul and another servicing clients and providing the downlink backhaul to other nodes (descendent nodes) of the network. Mesh nodes implemented with such a multi-radio backhaul form a hierarchical tree-like network topology called a "Structured Mesh", when they connect to each other, and as described in the referenced application Ser. Nos. 11/084,330, 10/434,948, and 12/352,457, operate in a manner similar to a wired switch stack where the routing table is distributed, thus aiding network scalability. A distributed routing table is constructed such that each node only contains information related to its descendant nodes and its parent node, but no other nodes in the network hierarchy tree above its parent. This way, the processing load for each node to process a packet is reduced. Although the highest performance for a "Structured Mesh" network occurs when separate radios are utilized for uplink and downlink connections, performance may also be enhanced when only a single relay radio is used as long as a distributed routing table methodology is utilized thus simplifying the routing computational task and thereby increasing the performance of the processor within the mesh node. For mission critical mesh applications such as military or first responder, it is also advantageous to include both single and multi-radio nodes whereby they can all communicate with a consistent routing protocol.

In some embodiments of the invention, the root of the hierarchical tree structure includes an external network connection to a server, to a WAN (Wide Area Network), to the Internet, or to any combination of these options. When a group of nodes implemented as such become separated or isolated such that the sub-network does not include a root connection as described above, challenges exist in maintaining a the required tree-like structure.

Unlike prior art mesh networks, a need exists in the art for a system capable of maintaining communication within a cluster during physical realignment of cluster components, as occurs during movement of wireless nodes in a mobile mesh network implemented as a tree-like structured mesh network.

SUMMARY OF INVENTION

An object of the invention is to provide a mesh network which overcomes many of the disadvantages of the prior art.

Another object of the invention is to provide a mesh network which retains structural integrity during all phases of usage, repair, or upgrading. A feature of the invention is that the logical relationship between network wireless access points or nodes is reconfigured by the nodes following changes to the physical environment of the network. An advantage of the invention is that it maintains the benefits of its structured approach even following additions, subtractions, or readjustment of network components, and regardless of whether mesh nodes contain one or multiple relay radios.

Yet another object of the invention is to maintain a structure to a mesh network such that separate data domains are maintained throughout the mesh network. A feature of the instant invention is that the structure of the mesh creates separate data domains within a larger network mesh. An advantage of the instant invention is that traffic within one or more domains does not impact non-involved domains.

Another object of the invention is to maintain connectivity with a mesh network, when connections to external networks are compromised. A feature of the invention is that network connectivity within a sub-part of the mesh network is maintained during the time the sub-part of the mesh network is not connected to an external network. An advantage of the invention is that it maintains a structure to support connectivity within the sub-part of the mesh even when the sub-part moves away from an external network link.

Another object of the invention is to facilitate re-connection to an external network subsequent to loss of an external network connection. A feature of the instant invention is that a sub-part of a mesh network which looses a connection to an external network may be configured to continuously scan for an available external network link. An advantage of the instant invention is that any part of the network separated from an external link, if directed to, will attempt to reconnect to the external link as soon as possible and therefore limit the amount of time a subpart lacks external network connectivity.

An object of the instant invention is to support orderly changes of configuration in a mesh network. A feature of the invention is that one or more components of the invention may be mobile. An advantage of the instant invention is that the underlying logical structure is updated to reflect physical changes in an orderly manner so as to maximize connectivity within each network subcomponent.

Yet another object of the invention is to facilitate joining of previously disparate structured mesh networks. A feature of the invention is that the logical structure of the network facilitates the joining of two previously distinct sub-networks. An advantage of the instant invention is that the mesh network can resume its structure upon the joining of two or more networks to form a larger structured mesh network.

Still another object of the invention is to facilitate orderly loss of a mesh participant. A feature of the invention is that the structure of the mesh is realigned following the loss or departure of one or more access points previously participating in the mesh. An advantage of the instant invention is that the mesh network structure can accommodate the withdrawal of one or more of the participating nodes with minimal disruption to the remaining network.

An object of the invention is to provide continuous access to network services upon the separation of one or more nodes from a larger network. A feature of the instant invention is that network services, such as address allocation pursuant to DHCP, which in the usual network are provided by a single central location, continue to be delivered to clients within a mobile subpart of the larger network. An advantage of the instant invention is that clients that move out of a larger network continue to have access to services, such as DHCP, during the time the sub-part of the network is separated from the larger network.

In one embodiment, the invention consists of at least two structured mesh nodes; wherein each structured mesh node comprises at least a connectivity logic; an uplink radio operating on an uplink frequency and a downlink radio operating on a downlink frequency; wherein the connectivity logic determines whether each structured mesh node connects with an external network or another node using its uplink radio and client devices or other mesh nodes connect to each node using each node's downlink radio; wherein the structured mesh network functions in two configurations selected depending on whether a connection to an external network is present; in the first connected configuration the structured mesh network includes at least one structured mesh node's uplink radio comprises a connection to an external network; and in the second isolated configuration none of the structured mesh nodes' uplink radio comprises a connection to an external network, and one of the structured mesh nodes acts as an isolated network root of the isolated configuration and all remaining nodes' connect to the isolated network root node as isolated root children nodes forming a tree-like configuration.

In another embodiment, the invention consists of at least two structured mesh nodes; wherein each of said at least two structured mesh nodes comprises at least a connectivity logic and a single relay radio; wherein the connectivity logic determines how each structured mesh node connects with an external network or another node; wherein the structured mesh network functions in two configurations selected depending on whether a connection to an external network is present; in the first connected configuration the structured mesh network includes a connection to an external network; and in the second isolated configuration none of the structured mesh nodes comprises a connection to an external network, and one of the structured mesh nodes acts as an isolated network root of the isolated configuration and all remaining nodes' connect to the isolated network root node as isolated root children and descendant nodes forming a tree-like configuration.

BRIEF DESCRIPTION OF DRAWING

The invention together with the above and other objects and advantages will be best understood from the following detailed description of the preferred embodiment of the invention shown in the accompanying drawings, wherein:

FIG. 9 shows a summary of the operation of a distributed DHCP service pursuant to the instant invention.

DETAILED DESCRIPTION OF THE INVENTION

The foregoing summary, as well as the following detailed description of certain embodiments of the present invention, will be better understood when read in conjunction with the appended drawings.

In some embodiments of the instant invention, the inter-access point communication occurs using agreed-upon wireless communication protocols, but a mesh may employ any communications means, wired or wireless. Further, one or more of the access points may be connected to an external network whereby client devices in communication with the mesh are capable of accessing the same external network.

Figures 1A, 1B:
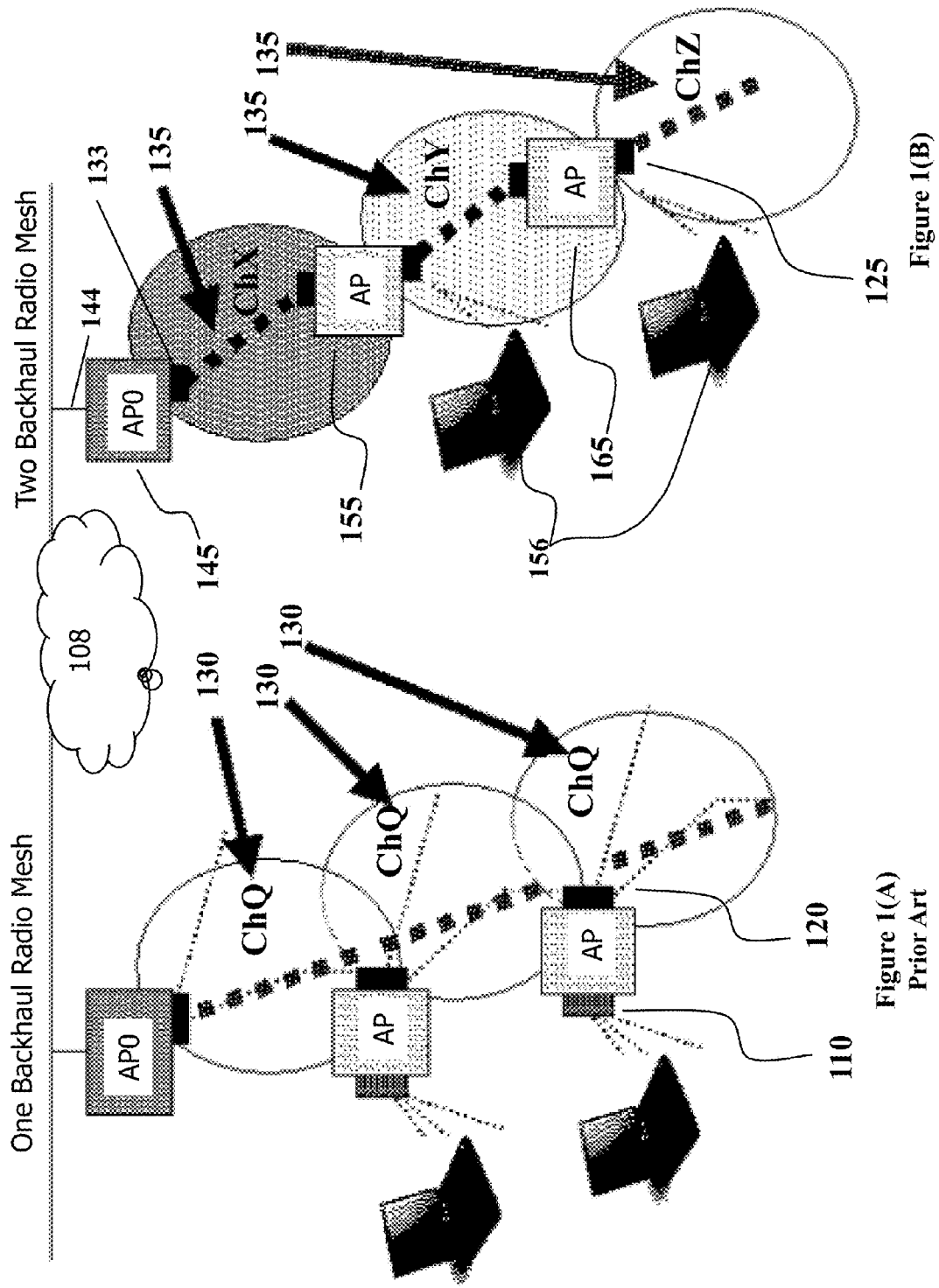
FIG. 1(a) depicts a prior art mesh network.
FIG. 1(b) depicts a mesh network featuring a dual-radio backhaul or relay pursuant to the instant invention.
Figure 2:
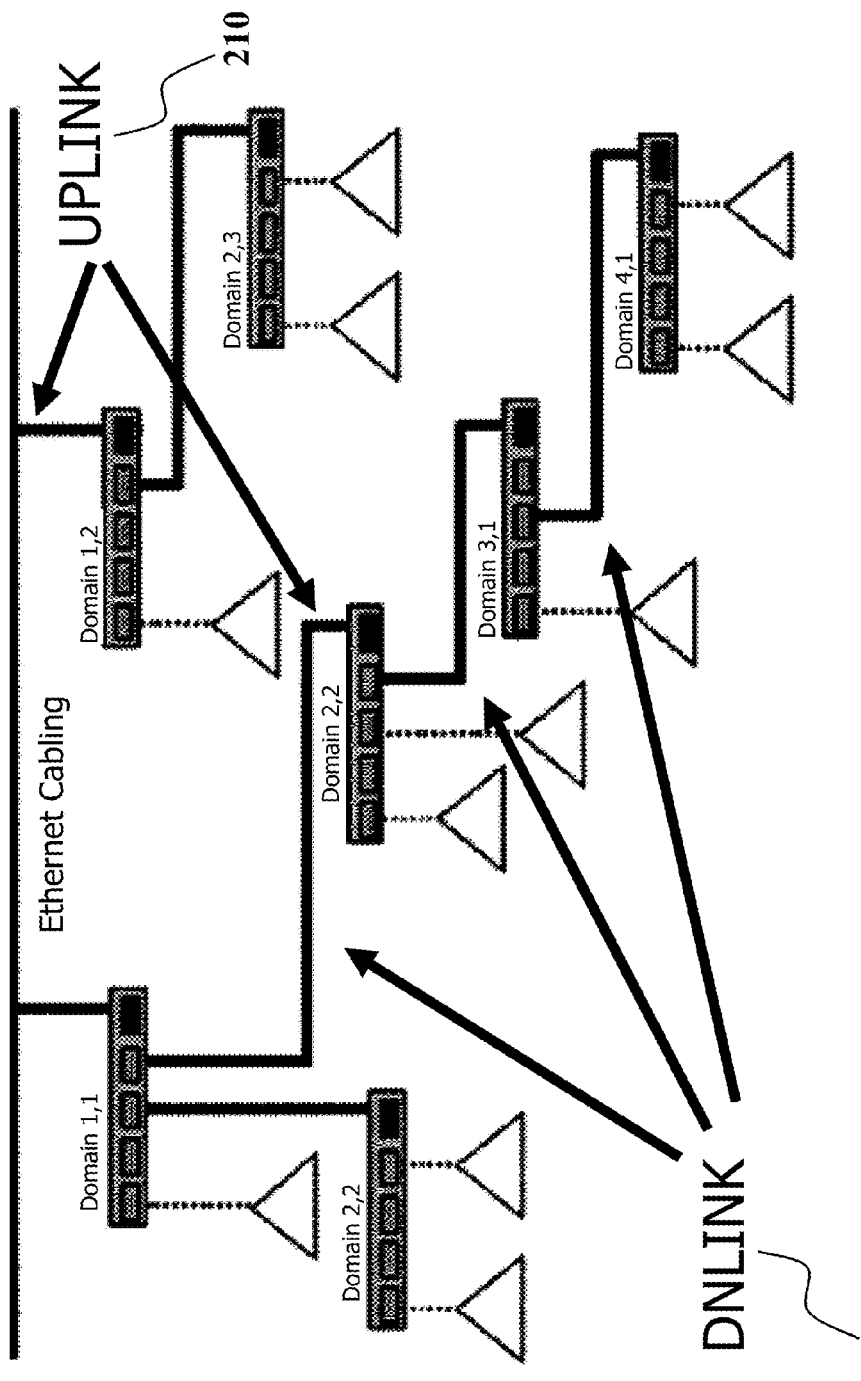
FIG. 2 depicts a prior-art wired stack of network switches.

Depicted in FIG. 1(B) and in FIG. 2 are two examples of mesh networks featuring links to an external network. Turning first to FIG. 1(B), depicted there are three nodes 145, 155, 165, wherein each node comprises an uplink connection and a downlink connection. Each node is considered an access point or "AP," and each node is physically identical, in one embodiment. For example, the top-most or root node 145 includes an uplink connection 144 and a downlink 133.

The root node 145 comprises an uplink 144 to an external network 108. A downlink wireless connection 135 on the root node 145, connects the root node 145 to its immediate child node 155. Inasmuch as the root node 145 includes a connection to both its child node 155 and the remaining descendant nodes in the mesh (nodes 155 and 165). Combined with a connection the external network 108, the root node 145 is considered a full functionality root (or FFR) node. (If the root node 145 did not include a connection to the external network 108, it would be considered a limited functionality root (or LFR) node.)

The downlink wireless connections 135 on the three nodes depicted in FIG. 1(b) employ distinct frequencies for transmission or transmission channels. The downlink on the root node 145 employs channel "ChX." In turn, the uplink on the first child node 155 employs "ChX" to communicate with the root node 145. In turn, the first child node 155 uses a different frequency or channel "ChY" to communicate with its immediate child node 165. The child node 165 uses the same ChY channel on its uplink so as to be able to communicate with its parent node 155. Finally, the child node 165 uses a third channel "ChZ" to communicate with any one or more nodes downstream (not pictured). In one embodiment of the present invention each of AP 145, 155, and 165 may employ separate radios for uplink and downlink connections. In another embodiment, a single radio may be employed in these APs. When a single radio is employed, it may utilize separate frequencies for uplink and downlink connections such as channels X, Y, and Z shown in FIG. 1B. Alternately, a single radio implementation may utilize the same frequency for uplink and downlink, essentially making channels X, Y, and Z all the same. A single channel implementation creates more co-channel interference in the mesh than a multi-channel implementation, but has some simplifications of operation that may be advantageous in some circumstances. Regardless of whether single or multiple relay radios are used, or how many RF channels are utilized for communication within the mesh, according to the present invention the connection topology will always be formed in a tree-like structure and each mesh AP or node will contain routing table data and connectivity logic consistent with a distributed routing table structure and a tree-like connectivity structure.

Each node connects with one or more client devices 156 wherein the client devices use the downlink channel on each node to communicate with the node. Therefore, for the specific implementation shown in FIG. 1B, the client 156 of node 155 communicates with node 155 using ChY. The client of node 165 communicates with node 165 employing ChZ.

Inasmuch as the child nodes 155 and 165 are able to communicate with the external network through the root node 145, these nodes are considered full functionality nodes (or FFN). Conversely, if the link 144 to the external network 108 was unavailable the child nodes would be considered limited functionality nodes (or LFN).

The benefit of the design of FIG. 1(b) stems from the structural division of communications between distinct devices. For example, a client 156 of a node 165 will not interfere with a client 156 of a different node, such as node 155. Inasmuch as channels ChX, ChY, and ChZ are selected so as to limit interference between these nearby frequencies, the wireless system divides clients of different nodes into different domains. This is the benefit of the instant invention whose system acts as much as the wired switch stack depicted in FIG. 2.

The structured approach of the instant invention may be implemented using any number of strategies. In the case of fixed-point wireless access points, the network channel assignments may be managed manually so as to create the separation of network domains discussed herein. However, an entirely different approach is required when dealing with mobile access points. In these instances, the mesh network must be capable of both maintaining the structure described above as well as accommodating movement of constituent access points and client devices.

Wireless mesh networks must be able to maintain the overall structure while accommodating change over time. The movement of a node, or set of nodes, may result in status changes for the moved nodes. For instance, when a node is communicating with an external network, its status is that of a full functionality node, or a full functionality root node. However, this node may move away from the external network link, loosing communications with same. The invention enables the remaining neighboring structured nodes to realign and compensate for the loss of the node. The transient node is reconfigured to reflect its new status and a new position.

The instant invention is a mesh network undergoing configuration changes. The mesh network starts in a first configuration and then enters a second configuration upon the occurrence of one or more events. A series of changes to the network may define overlapping sets of changing configurations. For example, if in an established mesh network, one node moves away from the network, and then returns to the mesh, the network has gone through a plurality of status changes.

As depicted in FIG. 1(B), the mesh network contains a link 144 to the external network 108. Such a network is considered "grounded" in that the network includes external access. The external network link 144 need not be a physical grounding, and may be accomplished through a wireless connection. Inasmuch as all the nodes 145, 155, 165, in FIG. 1(b) include a connection to the external network 108 these nodes are all considered grounded. In other words, while nodes 155 and 165 are embedded within the network such that the node 145 is intermediate the nodes 155 and 165 and the external network, nonetheless, all nodes are grounded to the network 108 simultaneously. If another node (not pictured) was not in communication with the external network 108 it would be considered a floating node or an isolated node.

Figure 3:
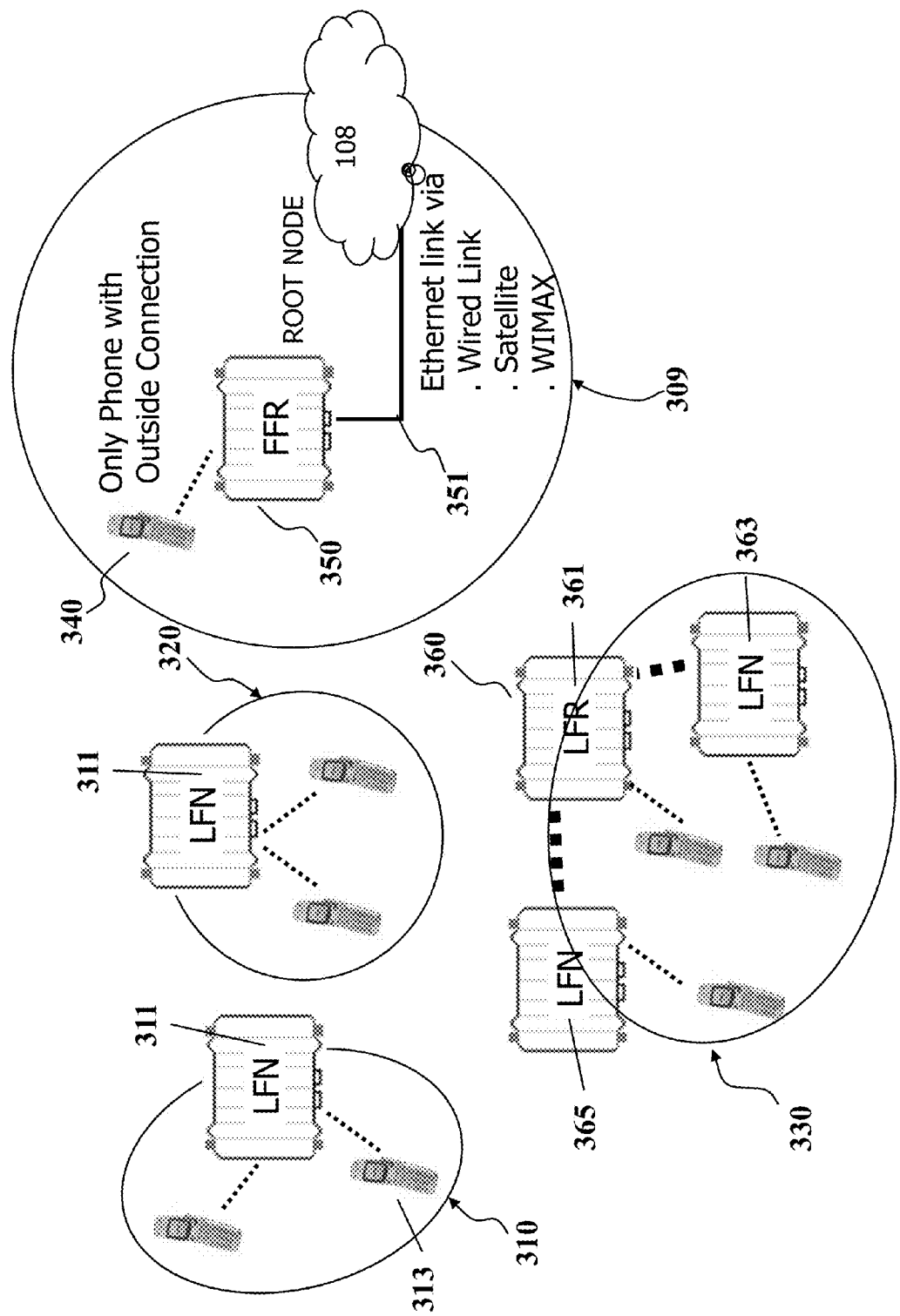
FIG. 3 depicts an embodiment of the instant invention comprising three sub-networks featuring the mesh structure of the instant invention.

Turning now to FIG. 3, depicted therein is an array of several access points having different connectivity status and therefore different roles. For example, one node 350 is connected to an external network 108 using a link 351. The link may employ any one of several network connectivity methods, including a wired Ethernet link, a satellite link, or a radio-based wireless link such as wifi or wimax. Inasmuch as node 350 is directly connected to the external link it is considered a full functionality node. Further, inasmuch as it is not connected to another node on its uplink, the node 350 is a root node. Combining the two node statuses, node 350 is a full functionality root node or FFR. On the downlink side of the FFR node 350, one client device 340, shown as a phone, is communicating with the FFR node 350. Given the client device 340 association with a FFR node 350, this client device 340 is able to communicate with the external network 108.

FIG. 3 also depicts three other networks 310, 320, and 330. These remaining networks do not have a connection to the external network 108 and therefore are considered to be floating networks or isolated networks. Networks 310 and 320 consist of single nodes 311 not associated with other nodes. Inasmuch as nodes comprising networks 310, 320, and 330 lack a connection to the external network 108, these nodes are considered limited functionality nodes. Clients of the limited functionality nodes, such as the client device 313 of the limited functionality node 311, do not have access to the external network 108.

Nodes comprising floating networks may form sub-networks between proximate nodes. In sub-network 330, one node 361 acts as a root node and is associated with two client nodes 363 and 365. The three nodes 361, 363, and 365, are able to communicate with one another. Therefore, the clients 364 associated with these three nodes are able to communicate with one another despite the lack of a connection to an external network 108 and the services available on the external network.

As shown in FIG. 3 both the grounded network 309 and the floating or isolated networks 310, 320, 330 share a common tree-like structure in that both types of networks encompass nodes with at least one node being a root node for all networks having more than one node. The roles and labels applied to each type of node are important to the functioning of an embodiment of the invention described below.

Inasmuch as the mesh nodes described by the instant invention comprise mobile nodes, one of the possible status changes is the establishment of communication between an isolated node, which would be a limited functionality node, with a grounded full functionality node.

Joining of Isolated Nodes to Grounded Nodes

As shown in FIG. 3, isolated nodes 311 lack a connection to the external network 108. Full network functionality is achieved through connection to the external network 108. In some embodiments of the invention, limited functionality nodes, such as nodes 311 will continuously scan to evaluate whether a connection to a full functionality node, such as node 350, is available. In other embodiments, the nodes do not focus on connection to a full-functionality node, inasmuch as the connection logic within the nodes 311 is programmed to follow a different set of policies. For example, limited functionality nodes may scan in an attempt to connect with other limited functionality nodes and/or full functionality nodes. In sub-networks comprising more than one node, such as sub network 330, the connection logic of each node is set to search for connections to other nodes thereby increasing the area where a connection may be found.

Pursuant to a searching directive, networks 310 and 320 coalesce by establishing a link between their two limited functionality nodes 311. Further, the expanded network, may in turn establish a connection with the full functionality node 350. This expanded network is depicted in FIG. 4.

Figure 4:
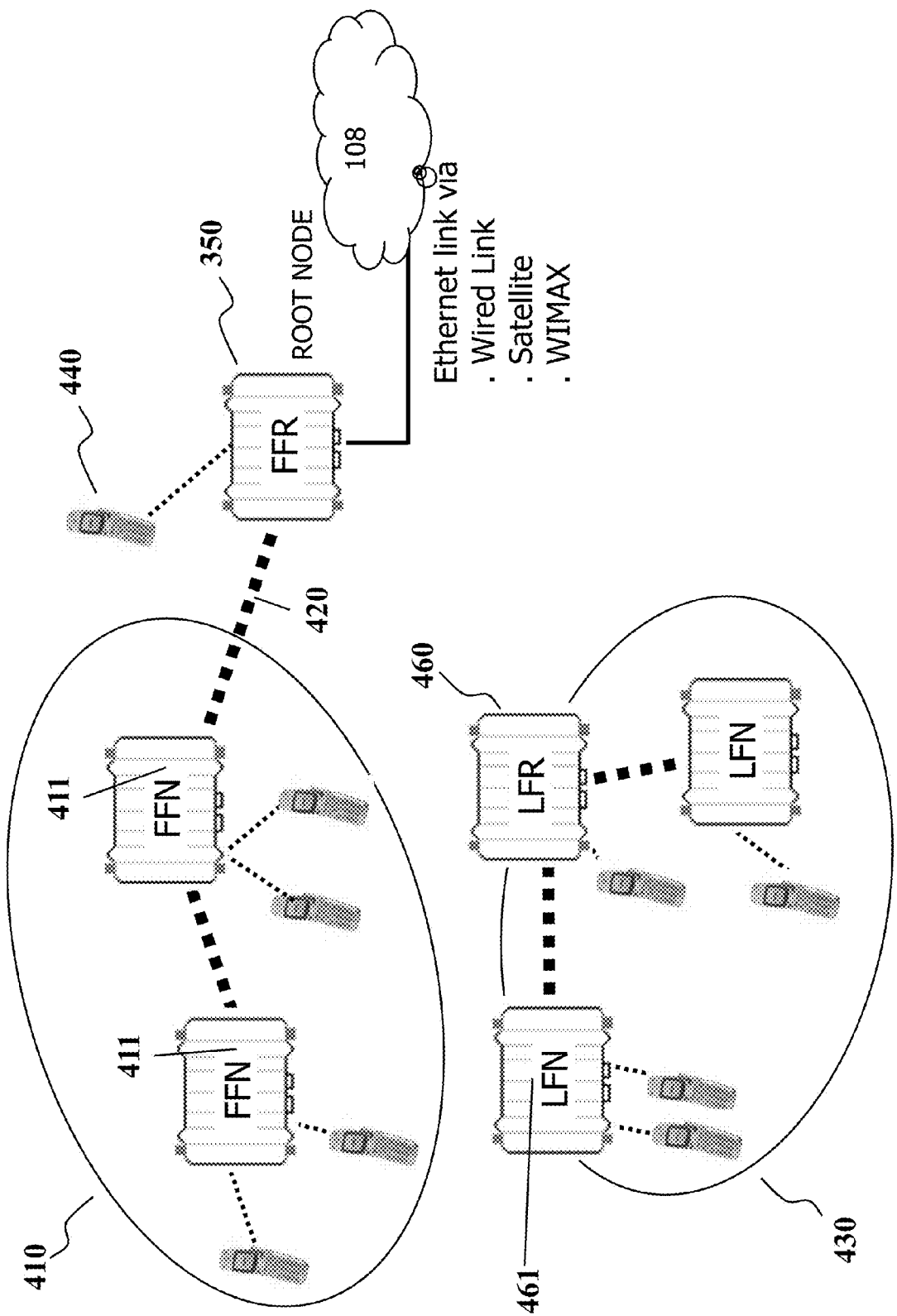
FIG. 4 depicts an embodiment of the instant invention comprising two sub-networks featuring the mesh structure of the instant invention.

Turning now to FIG. 4, the grounded network, previously consisting of only one node 350 currently includes the full function root 350 as well as the sub-network 410 comprising nodes 411. The nodes 411 are considered full function nodes 411 inasmuch as these nodes, and the nodes' respective clients, are now connected to the external network 108. The external network is accessible through the connection 420 between one of the full function nodes 411 and the full function root node 350. The clients of the full function nodes 411 may continue to communicate within the sub-network 410 or exchange information with the external network 108 using the connection 420 to the full function root node 350 which in turn is connected to the external network 108.

Also depicted in FIG. 4 is a second isolated network 430. This second isolated network 430 is unable to establish communication with any full function nodes. Therefore, the clients associated with nodes participating in the sub-network 430 are only able to communicate within the sub-network 430. However, this embodiment of the instant invention provides a means for dividing network traffic into sub-domains given that communications between the clients of the sub-network occur independently of the status of the full function nodes.

In one embodiment, the limited functionality nodes of the sub-network 430 continuously scan in an attempt to establish connectivity between the limited functionality nodes and a full functionality node. For example, node 461 continues to scan for any full-functionality nodes nearby using its uplink and downlink radios.

Figure 5:
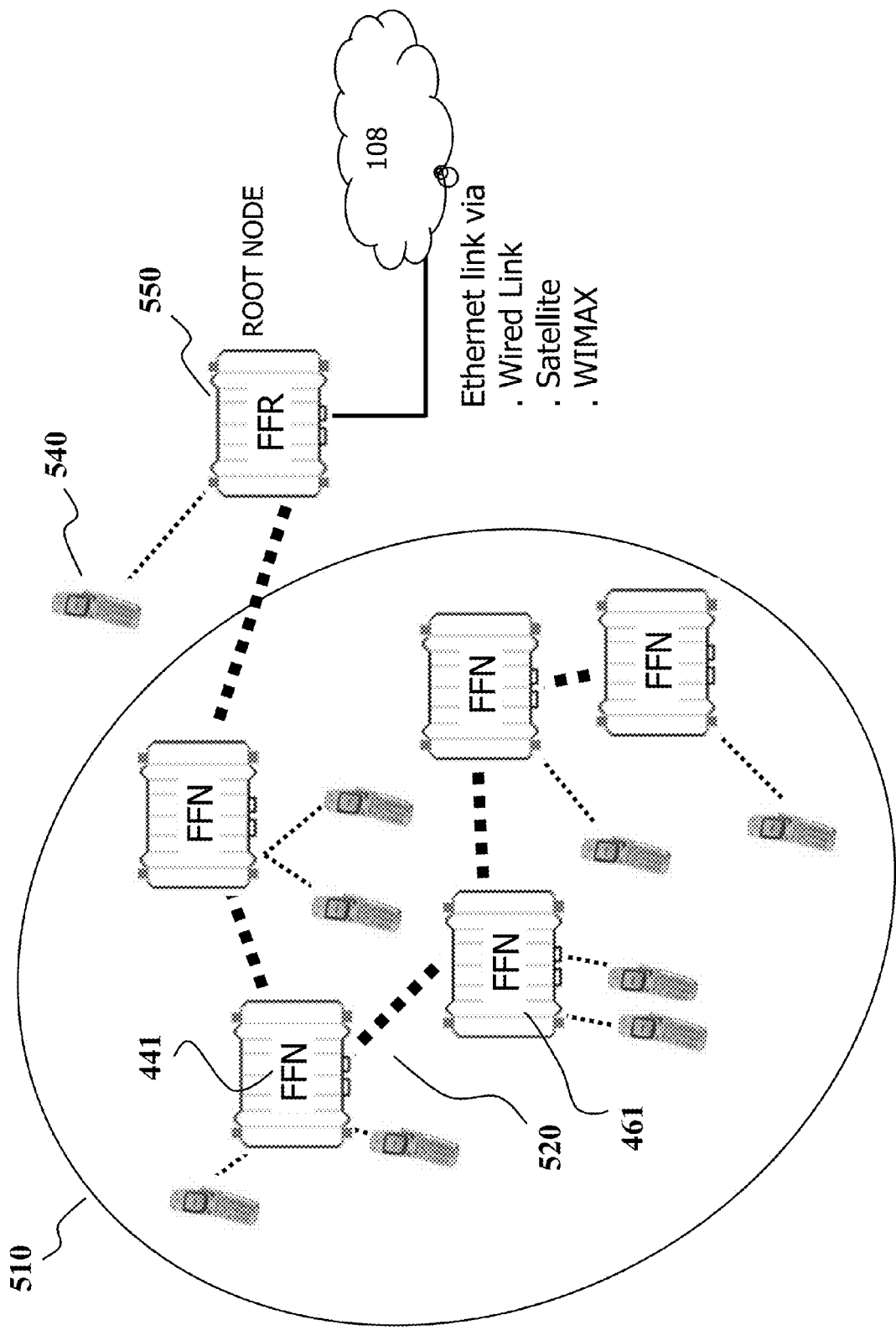
FIG. 5 depicts an embodiment of the instant invention comprising one overall network featuring the mesh structure of the instant invention.

Turning now to FIG. 5, depicted there is a change of configuration of the system wherein the node 461 establishes a communication link 520 with a full-functionality node 411. Upon the establishment of the link 520, the node 461 becomes a full functionality node inasmuch as the node is now able to communicate with an external network 108. All nodes in the newly established network 510 have become full function nodes inasmuch as every node in the network 510 is connected to the external network 108 through the full function root node 550.

The network transformations depicted in FIGS. 3 to 5 are driven by policy directives within each network node. A network node comprises connectivity logic which allows the node to react to similar environmental circumstances in different ways depending on the policy directives set as part of the initialization process of the connectivity logic. For instance, in FIG. 4, one of the nodes 411 established a link 420 to the full functionality root 350 inasmuch as the connectivity logic on the node 411 instructed the node to search for opportunities to connect to full functionality nodes. The initialization procedure is discussed below.

Initialization of Nodes

In one embodiment of the invented system, the directives for each node are set using a policy server during a node initialization step. As part of the node initialization, the policy server directs the node to take on one or a plurality of roles. For example, the node may be instructed to continuously look for a full functionality node (either a root or another node). Conversely, the node may be instructed to follow a radio silence policy where it specifically avoids contact with other nodes. For purposes of illustration, the embodiments described herein generally seek out other networks to increase network coverage by establishing connections between limited functionality and full functionality nodes. In light of the type of mission to served by the mesh being initialized, the policy directive may involve any one of several alternative instructions.

Figure 6:
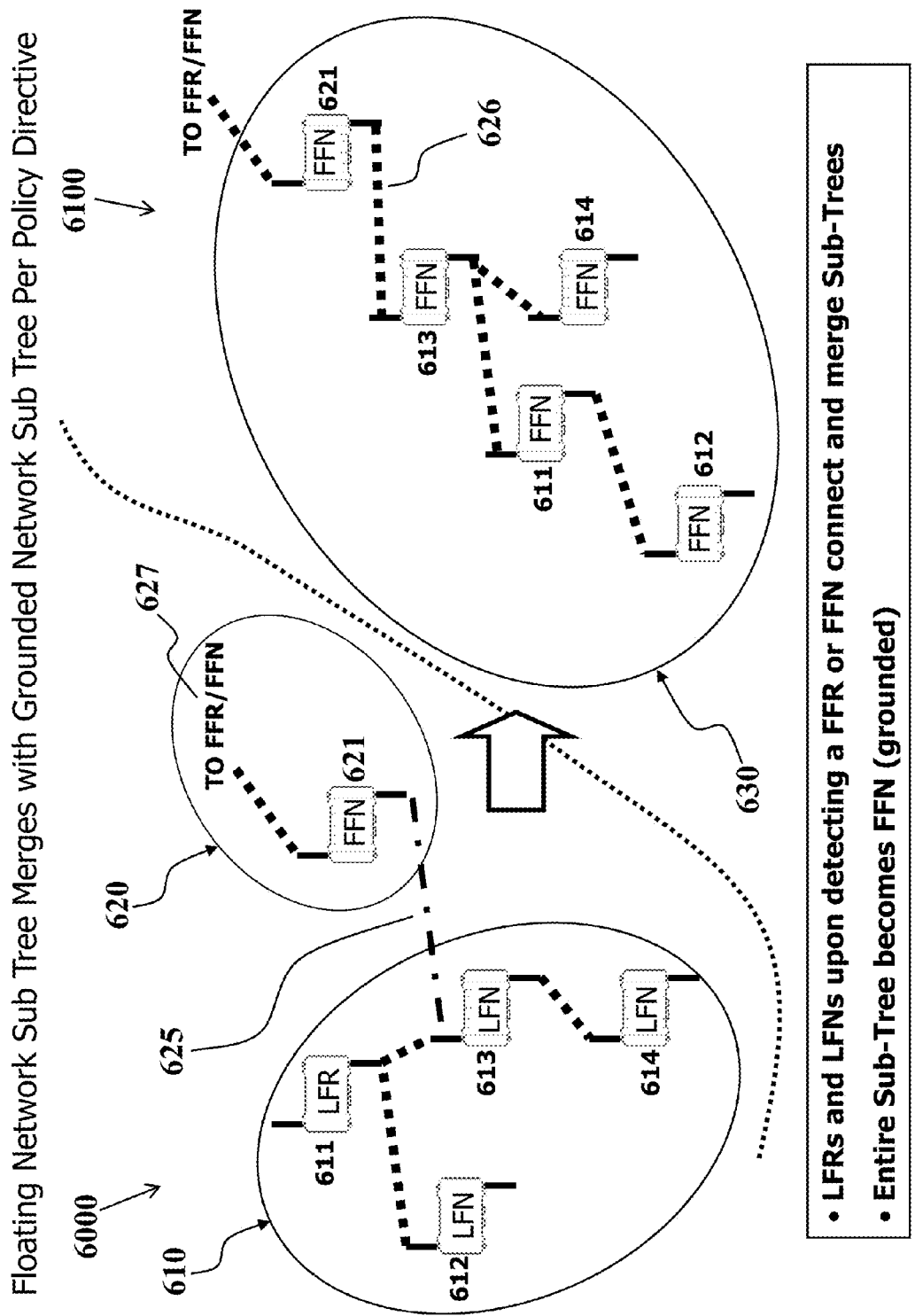
FIG. 6 depicts two configurations of an embodiment of the instant invention.
Figure 7:
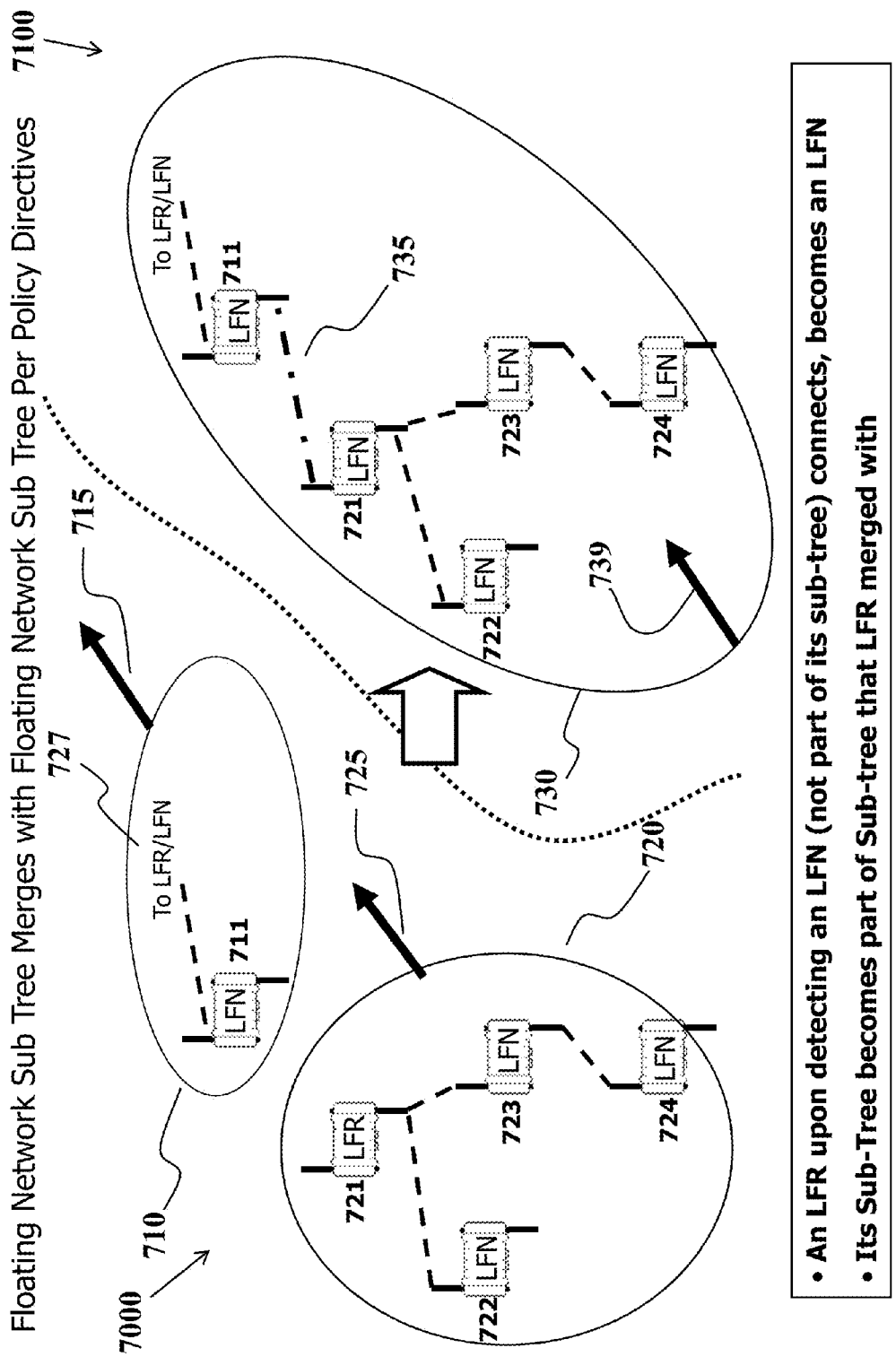
FIG. 7 depicts two configurations of an embodiment of the instant invention.
Figure 8:
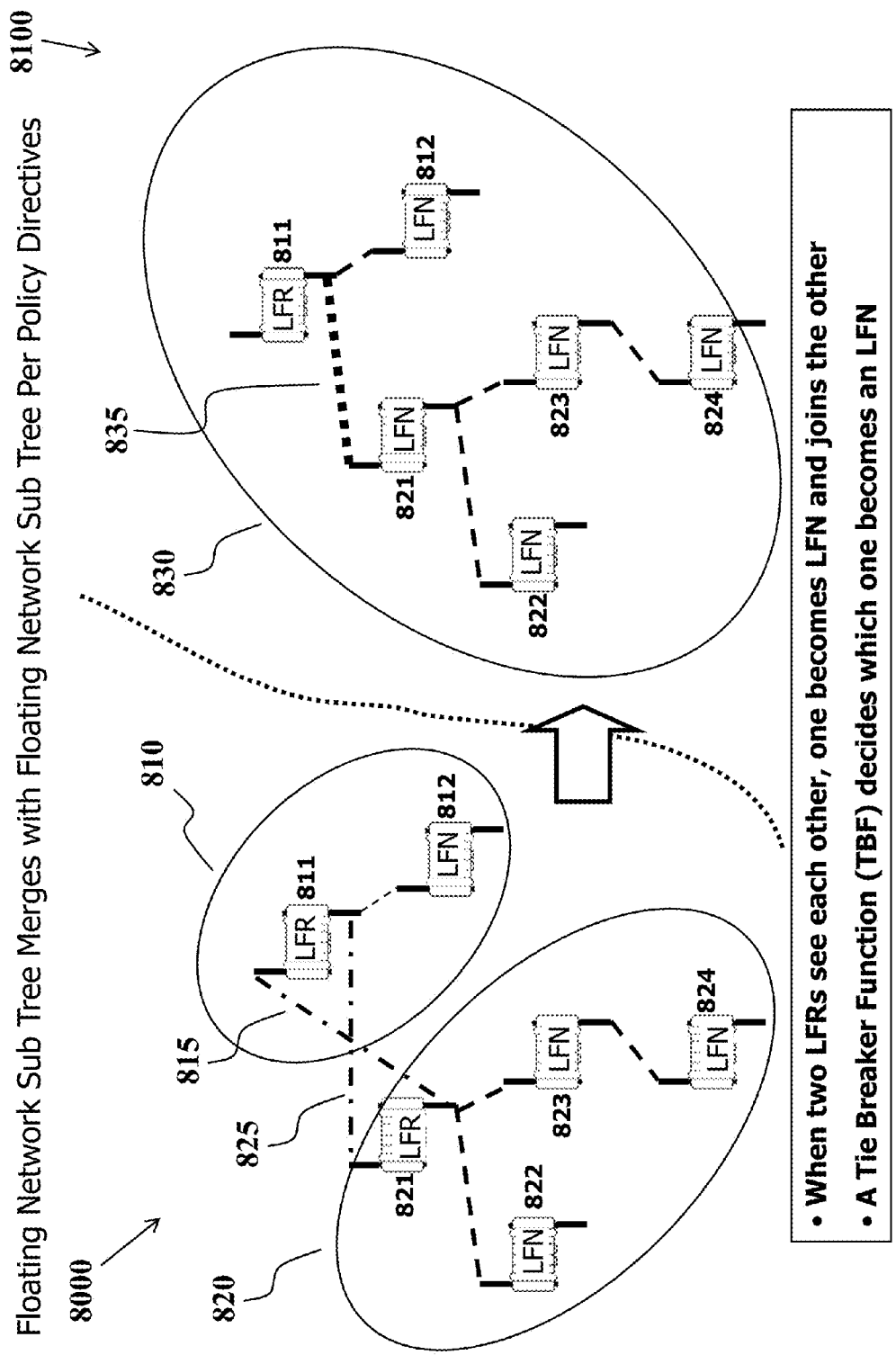
FIG. 8 depicts two configurations of an embodiment of the instant invention.

The invention provides several methods of joining sub-networks, wherein the sub-networks are either grounded (connected to an external network) or floating (isolated from an external network). FIGS. 6 to 8 describe algorithms for connecting various types of networks.

Joining of Sub-Networks

Turning now to FIG. 6, described therein are three sub-networks 610, 620, and 630. Sub-network 610 comprises a root node 611 and three child nodes 612, 613, and 614 connected to the root node 611. At a first time interval 6000 shown in FIG. 6, node 613 is establishing a link 625 with a node 621 of another sub network 620. At time interval 6000, the nodes of sub-network 610 are limited functionality nodes inasmuch as the nodes contain connections to each other, but not an external network (not shown). The second sub-network 620, however, includes a full functionality node 621 which is in communication with a full function node or the full function root (not shown).

A second time Interval 6100 shown in FIG. 6 occurs following the establishment of the link 625. The node 613 has successfully established a stable link 626 with the node 621. The resulting network 630 now features full functionality nodes inasmuch as each node include a connection to the full functionality root (not shown) through the full functionality node 621. Node 611 functioned as a limited functionality root at the first time interval 6000 inasmuch nodes 612 and 613 were in communication with it. However, at the second time interval 6100, node 611 lost its status as a root given that its traffic now reaches the destination through another node 613. The loss of the root node role by node 611 was caused by the fact that one of a child node 613 detected the full function node 621.

While channel management policies (described below) ensure that the joining of the networks 610 and 620 is possible, it may be preferred to allow only the limited functionality root node 611 to initiate the connection with the full function node 621. If the limited function root node 611 initiates the connection 626, the structure of the sub network 610 need not change logical structure. While the limited functionality root node 611 would cease to operate as a root node 611 upon connection with the full functionality node 621, no structural changes are necessary to the sub-network 610.

Consequently, in some embodiments of the invention, one of the policy directives set during the initialization of the nodes is to limit scanning for full function nodes to solely the roots of each floating or isolated network.

FIGS. 7 and 8 demonstrate embodiments of the invention wherein joining of networks requires the resolution of several conflicts prior to the joining of several sub-networks.

Turning first to FIG. 7, depicted there at a time interval 7000 are two sub-networks 710 and 720. Sub-network 715 is traveling in the Northeast direction 715. Sub-network 720 is also traveling in the Northeast direction 725. Node 721 of sub-network 720 is a limited functionality root. Node 711 of sub-network 710 is a limited functionality node which connects through its uplink to another limited functionality root (not shown) upstream 727 from node 711.

If the policy directive instilled in the node 721 is to join with any new nodes detected, even if the new node is a limited functionality one, then node 721 would have to give up its status as a root node upon connecting to the detected node. In the embodiment shown in FIG. 7, at time interval 7100, node 721 establishes a link 735 with the node 711. Inasmuch as the node 721 is now connected with another node 711, the node 721 ceases to be a root node.

In the embodiment shown in FIG. 7, the nodes comprising the two sub-networks 710 and 720 are aware of the direction of travel of the two nodes. Inasmuch as node 721 realizes that node 711 is ahead of node 721, node 721 considers itself to be "downstream" in the direction of travel from node 711. Consequently, in connecting with node 711, node 721 relinquished its status as a root node and instead became a standard limited function node. The resulting network 730 shown at time interval 7100 continues to travel in the same Northeastern direction 739 with a single limited functionality root node (not shown).

As is shown in FIG. 7, in some embodiments of the invention, the nodes comprising the mesh network or sub-networks contain movement-detection means. In one embodiment, the movement detection means comprises a GPS sensor, however, other methods, such as radio signal triangulation of cellular telephone signals may be used. The nodes comprising the mesh network shown in FIG. 7 exchange with each other each node's current position as well as each node's direction of travel so as to be able to determine which node is downstream of which node.

Turning now to FIG. 8, depicted therein are two time intervals 8000 and 8100. At time interval 8000, two sub-networks 810 and 820 are separated from one another. Sub-network 820 comprises four nodes 821, 822, 823, 824 with one node 821 being the root. Conversely, sub-network 810 comprises two nodes 811 and 812 wherein node 811 is the root. Inasmuch as neither sub-network includes a connection to an external network (not shown), both networks are floating networks and all nodes comprising the networks are limited functionality nodes.

At point 8000, root node 821 detects root node 811 by a running a scan 825. Simultaneously, root node 811 detects root node 821 by operating a scan 815. Before the two sub networks may join together, one of the nodes must relinquish its role as a root node. In FIG. 7, the decision as to which node will become the root node was determined by the direction of travel of each sub network. In the embodiment shown in FIG. 8, the sub networks are not aware of their respective directions of travel. Therefore, the choice of a new root node must be made using a conflict resolution policy.

Several alternative policies may be implemented to determine which node should relinquish its role. For example, the root node of the larger network (node 821) could be allowed to remain the root node pursuant to one policy. In another tie-breaker policy directive, a root node is chosen randomly. Depending on the embodiment of the invention involved in the conflict, it may be decided that the root node closest to the external network maintains its status. This "geographic proximity" policy requires nodes to contain means of detecting geographic position as well as being provided the last known position of a full function node (i.e. a node with a connection to an external network). Another tie-breaker policy may factor which node is farther downstream, as was the case in FIG. 7.

Other reasons to select a root node relate to the data traffic found on both sub-networks. In one traffic-based method, the root node traversed by more traffic is allowed to keep its status. Alternate traffic-based analysis methods compare the properties of the several possible resulting networks. For example, in one method, a root node is chosen such that the resulting network's traffic must traverse the fewest number of nodes in order to reach its destination. Minimizing the number of access points that must be traversed for traffic to reach destinations results in improved performance of the network. In terms of performance, the root may also be chosen such that the resulting network features maximum bandwidth or minimum delay of traffic due to signal loss (jitter). Another approach seeks to minimize the latency of the resulting network.

Any one of the above policies is employed to achieve the performance goals of a given mesh network implementation.

In FIG. 8, the policies of the root nodes 821 and 811 resulted in the selection of node 811 as the root node. Therefore a new connection 835 was established at time interval 8100 and the node 821 ceased to be a root node but instead became a standard node. Node 811 remained the root node and at time interval 8100 became the root node of a new combined network 830.

Provision of Network Services

Network devices generally rely on one or more services provided by one or more servers connected to the network used by the network devices. For example, in order for network client devices to communicate with each other and with the nodes, each client device and each node must be assigned an identifier, such as an IP address. While it is possible to manually assign IP addresses to devices, this manual apportionment of addresses creates significant overhead in that each device must be tracked and its IP address assignment recorded so as to ensure that no two devices are assigned the same IP address.

In order to avoid manual assignments of addresses, wired networks employ network-wide services such as a Dynamic Host Configuration Protocol server, (hereinafter "DHCP") to assign IP addresses to clients. In an embodiment of the invention, only one DHCP server exists in a network to ensure that no IP conflicts are created. While wired networks may employ a single DHCP server, isolated networks have no access to this single server. Therefore each isolated network node servicing clients according to the instant invention will include its own DHCP server.

When previously-isolated sub-networks establish network connectivity for the first time, there is a possibility of IP address conflicts between the client devices, especially if the nodes rely on a conventional DHCP server. An enhanced DHCP server is discussed infra. A conventional DHCP server may have previously assigned addresses to clients in either cluster, and inadvertently assigned redundant addresses. To avoid this problem, a means for assigning IP address is disclosed infra for the distributed DHCP server capability in network nodes according to this invention.

While an IP address conflict may be resolved through arbitration, prevention of address conflicts is preferable. An approach to reducing the probability of a conflict to less than 1 in 215 is described. Note that the same approach may be used to reduce the probability even further to 1 in $2^{32}$ or lower. Further, the approach is applicable to any device network identification scheme, such as IPv4 or IPv6.

The reduction in the probability of a conflict is accomplished by splitting up or otherwise separating the IP domains in an autonomous and randomized manner such that each mesh node has a range of IP addresses that it can freely assign to clients with de minimis risk of IP conflicts occurring. Each mesh node randomly selects a DHCP range to assign client addresses. As part of the process of discovering and connecting with new network nodes, this DHCP range is broadcast in a special information packet to other nodes when the node is scanning to join other nodes. If there is a conflict in the range, it is resolved by one node selecting a new DHCP address range, a random number range set is selected and tie breaker functions are employed all before the nodes become part of the same network. This pre-emptive measure is a means to ensure minimal disruption of client services.

IPv4 addresses assigned by DHCP servers take the form A.X.Y.K. wherein each number is an integer from 0 to 255. Let A arbitrarily be set based on a customer identifier for the mesh network layout. K is chosen as an identifier for a client attached to the network node. Therefore, each client of a single node will share the same first three digits of an IP address, with the last digit "K" being incremented for each client device connected to a single node.

With A and K selected, X and Y combinations provide a total of 2*16 integers or 232 possibilities. This amounts to over 65,336 network nodes coexisting in the same place each with up to 255 clients each with no inherent IP conflicts.

Let us assume that a 15 bit random number generator is used to generate the values for X and Y at each isolated network node. Sections of the random number may be used to set the values for X and Y for the DHCP server at each node.

Let M and N be the decimal equivalent of the 7 MSB and 8 LSB of the 15 bit random number. The DHCP address space is then:

A.[255-M].N.0 to A.[255-M].N.254 where 0<=M<=127 and 0<=N<=255

This allows for a network of up to 32768 network nodes with distributed DHCP capability—each of them having up to 255 clients each.

The improved DHCP server is summarized in FIG. 9.

Channel Management

As shown in FIG. 1(b), the mesh nodes follow the switch-stack approach of FIG. 2 inasmuch as FIG. 1(b) nodes utilize a separate uplink and downlink communications means. In case of wireless nodes, each uplink and downlink communication means comprises a wireless radio wherein the frequency or channel of each respective radio is distinct and therefore non-conflicting. Every backhaul radio is on a different, non-interfering channel creating independent subnets which split the larger mesh into successive sub-domains.

The downlink and uplink frequency selections create relationships between nodes. For example, in FIG. 6, at time interval 6000, node 611 is the root node with nodes 612 and 613 being its immediate children. Inasmuch as node 611 is a wireless node it uses two frequencies, an uplink frequency and a downlink frequency. The uplink frequency on node 611 is not being used for communication inasmuch as node 611, being a root, is not connected to another node above it. However, the separate downlink frequency is being used to communicate with both children nodes 612 and 613. Node 613 is shown extending a scan 625 searching for another node, via the uplink of node 613.

The joining of two previously separated networks, as is shown in FIGS. 6, 7, and 8, may create channel conflicts within the resulting network inasmuch as previous child-root relationships may be disrupted. An example of a disrupted relationship is shown in FIG. 6 at time interval 6100 wherein the node 611 became a child node of node 613 while at the prior time interval 6000 the node 611 had been a parent of node 613.

In order to facilitate the transition between node statuses, the instant invention applies a series of policies which are introduced into each node during the mesh initialization step described above. In other embodiments, the merging conflict resolution policies are updated regularly during mesh deployment. Regardless of the way in which the policies are introduced, the policies must be able to accommodate any number of possible network join events. FIG. 6-8 demonstrated only a few possible join scenarios. Consequently, the conflict resolutions must not be exceedingly strict.

In some embodiments, one of the goals of the conflict resolution policies is to decrease the number of channel changes necessary upon joining of networks. For example, in FIG. 7, node 721 uses its otherwise unoccupied uplink to detect node 711 at time interval 7000. In establishing a connection 735 between the uplink of node 721 and the downlink of node 711, the uplink node 721 changed the node 721 uplink channel to match the downlink channel of node 711. This channel switch was the only change of channel necessary to bring the two networks together. At time 7100, the uplink channel of node 721 was non-conflicting with the downlink channel of node 721. In one embodiment, one of the policies of joining stored in the nodes is to accept a partial channel conflict upon joining so as to minimize cascading channel changes.

The more common circumstance is that a node other than a root is the one that establishes a new connection. In such instances, more than one channel change may be required. The invented system therefore comprises several methods of changing channels.

The Least Ripple Match

One approach to changing channels is minimizing the number of channel changes within the mesh needed to maintain separation. For example, in FIG. 6, the establishment of a network link 626 between node 613 and 621 forces node 613 to adopt as node 613 uplink frequency the downlink frequency of node 621. If node 613 has to change its uplink frequency, then the connection to node 611 would be terminated, unless node 611 also changes its downlink frequency accordingly. However, changing the downlink frequency of node 611 would force a change of frequencies by node 612. Consequently, changing the frequency by node 613 results in at least three changes of frequencies. This number of frequency changes is unfavorable inasmuch as any client devices in communication with nodes 611, 612, and 613 would also have to change communication frequencies and may temporarily loose a connection.

The alternative scenario at time interval 6000 is for node 613 to maintain its uplink frequency and for node 621 to change its downlink frequency. If node 621 changes its downlink frequency to match the uplink frequency of node 613, then at time 6100 the link 626 may be established. However, the link was established with only a single frequency change—the change of the node 621 downlink frequency to match that of the node 613 uplink.

The second scenario described above results in the fewest changes and consequently would be the one adopted by the system in one embodiment wherein joining of networks is to occur with the fewest changes. The nodes comprising the mesh are able to keep track of the frequencies of nodes participating in the mesh so as to be able to calculate the number of changes necessary in an expedient manner.

In some embodiments the mesh network nodes calculate all possible changes necessary and select the alternate with the fewest changes required. In other embodiments, the mesh network selects a scenario resulting in an acceptable local minimum number of channel changes.

Further, while in FIG. 6, solely node 613 detected the presence of node 621 using its scan 625, some of the frequency adjustments may have been avoided if node 611, the limited functionality root, had been the one to connect with node 621. Consequently, in some embodiments of the invention, only unused uplinks on roots nodes are used for scanning for new connections. However, the networks are most likely to join together if all the nodes are scanning for possible neighbor nodes within range.

Local Optimization

In some embodiments of the invention, each node determines locally as to whether to change frequencies upon joining with another node. In this default environment, no frequencies are set aside and each node attempts to determine which channel change results in the best local outcome.

The software for making autonomous choices for each node is described in applicant's earlier U.S. application Ser. No. 10/434,948 filed on May 8, 2003, now U.S. Pat. No. 7,420,952, whose contents are incorporated by reference. As described in that earlier application, the autonomous choices are designed to fulfill one or more local efficiency goals.

The first goal is to ensure that there is sufficient channel separation between uplink and downlink radios on the local node to ensure adequate adjacent channel separation. Channel separation is considered sufficient when the frequencies of one channel are so different as to result in no interference with the transmissions on another frequency.

Second, each node seeks to limit ripple effects caused by changing an uplink or downlink frequency where the local node is connected to other nodes either on the downlink side or the uplink side. If no conflict can be avoided, after a scan of the environment, downlink channels are selected based on the least congested channel that also satisfies conditions for channel separation between uplink and downlink.

The alternative methods rely on specifying sets of channels to a node or groups of nodes. Internal channel sets are designed for communication between nodes while common sets are designed for communication with other networks. By assigning non-conflicting channels sets, sub network combinations can occur with less contention.

Internal Channel Sets

A further approach to minimizing channel switches during joining of networks is to assign different channel subsets to each network during the initialization of the nodes which are predetermined to comprise a given network.

In some embodiments, the mesh member nodes are allowed to change membership as the physical position of each member node changes. In other embodiments, the member nodes stay within one general group, forming a substantially permanent sub network. While the sub network may be mobile, the member nodes comprising the mesh remain constant.

Given a circumstance where the sub networks have at least partially permanent membership, certain channels are dedicated for use by a particular sub network or a plurality of sub networks, and no other sub network within the area. Consequently, upon joining of several sub networks, the sub networks do not suffer from internal conflicts, but must only negotiate frequencies to facilitate inter-sub-network communication.

Use of Common Channel Sets

A further addition to methodology is to dedicate certain frequencies to act as joining frequencies dedicated to serve as the uplink channels of root nodes and the downlink channels of leaf nodes of the tree. In other words, the leaf nodes use special downlink frequencies if no other node is connected on the downlink frequency. By employing the common channels, two networks are able to join together while leaving channel assignments inside the network constant.

For example, in FIG. 7, each sub network 710 and 720 may represent a single convoy of military trucks. In some embodiments, the convoys are physically designed to meet only at the head and the tail, much like the joining of train carriages. Consequently, there is never any intermixing of the access points within the sub networks, only on the boundary access points.

If the two sub-networks had previously dedicated a set of one or more frequencies to be the "common" frequencies not used internally within each network, then the two networks may now join with no frequency changes for connections within each network. The joining of node 721 and 711, forming a new link 735 will use the common frequency. By definition, the common frequency does not interfere with the frequencies used internally within each network. Inasmuch as the two networks do not intermix, the internal frequencies used by each network are arbitrary. Even if the internal frequencies of sub networks 720 and 710 are identical, no interference will occur since frequencies different from those used internally in either sub network will be used for joining, The sole point of communication between the two networks is the new link 735 which may adopt the common frequency for communications between the two networks without any internal frequency reassignments.

Joining Using Underutilized Frequencies

An additional means for facilitating network combinations is to include the capability to operate in more than one frequency range. For example, if two nodes have detected one another, the nodes may exchange radio capability information prior to establishing a permanent link. Upon exchanging capabilities information, the nodes may detect that each node includes the capability to broadcast in frequencies beyond the usual frequencies used within the network. Consequently, joining on this previously unexploited frequency range virtually guarantees a network join without having channel changes propagated within each sub network.

For example, in FIG. 7, in one embodiment, nodes comprising the sub network 720 all communicate in various frequencies in and around 2.4 GHz. Similarly, sub network 710 uses a similar set of frequencies in and around 2.4 GHz. The 2.4 GHz frequencies were chosen for the two sub networks to accommodate the client devices within each sub-network. However, for the communication between the two nodes, node 721 and node 711 may adopt a completely different range. In one embodiment, node 711 being the tail node, and node 721 being the root node, include an additional 5 GHz communication capability which can be accomplished with multiple frequency range radios and wideband antennas, or by including additional radios and/or antennas. Consequently, the two nodes 721 and 711 are able to establish a link 735 without any chance of interference with the respective internal links within each sub-network.

Each node contains connectivity logic which allows the node to adopt one or more of the above-described contention resolution policies. Further, the connectivity logic is designed to update the list of possible alternate policies which may be applied by individual nodes separately, or in unison. Each policy is activated depending on the environmental circumstances encountered by each mesh network. For example, in the event that the mesh networks are deployed as part of a structured convoy, certain policies are more applicable than others (as described above). Upon the joining of two networks together, the connectivity logic of each constituent node may be updated to reflect the common network created by the nodes.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The invention claimed is:

1. A structured mesh network capable of isolated operation, comprising:
   at least two structured mesh nodes;
   wherein each structured mesh node comprises at least a connectivity logic; an uplink radio operating on an uplink frequency and a downlink radio operating on a downlink frequency; wherein the connectivity logic determines whether each structured mesh node connects with an external network or another structured mesh node using its uplink radio and whether client devices or other structured mesh nodes connect to each structured mesh node using said each structured mesh node's downlink radio;
   wherein the structured mesh network functions in two configurations selected depending on whether a connection to said external network is present—a connected configuration and an isolated configuration;
   wherein in the connected configuration the structured mesh network includes at least one structured mesh node whose uplink radio comprises a connection to said external network; and
   wherein in the isolated configuration none of the structured mesh nodes' uplink radio comprises a connection to said external network, and one of the structured mesh nodes acts as an isolated network root node of the isolated configuration and all remaining structured mesh nodes connect to the isolated network root node as isolated root children nodes forming a tree configuration;
   wherein clients and children nodes of each structured mesh node of the structured mesh network in the isolated configuration retain full connectivity within the structured mesh network when the isolated configuration is in effect; wherein the structured mesh network in the isolated configuration includes the isolated network root node having a local Dynamic Host Configuration Protocol (DHCP) server for the isolated configuration,
   wherein said DHCP server randomly selects a random address range from which to assign addresses to clients of said DHCP server.

2. The structured mesh network of claim 1 wherein the connectivity logic contained by the structured mesh nodes realigns connections between the structured mesh nodes upon loss of said connection to said external network to form the isolated configuration.

3. The structured mesh network of claim 2 wherein the connectivity logic contained by the structured mesh nodes designates the structured mesh node which in the connected configuration was connected to the external network as the isolated network root node.

4. The structured mesh network of claim 2 wherein the connectivity logic contained by the structured mesh nodes designates the structured mesh node which in the connected configuration passed the most traffic as the isolated network root node.

5. The structured mesh network of claim 2 wherein the connectivity logic contained by the structured mesh nodes selects the isolated network root node such that the resulting network's traffic traverses a minimal number of nodes.

6. The structured mesh network of claim 2 wherein the connectivity logic contained by the structured mesh nodes selects the isolated network root node such that the isolated network root node is the most proximate to an external network connection point.

7. The structured mesh network of claim 2 wherein the connectivity logic contained by the structured mesh nodes selects the isolated network root node such that the resulting network's throughput is maximized.

8. The structured mesh network of claim 2 wherein the connectivity logic contained by the structured mesh nodes selects the isolated network root node such that the resulting network's latency is minimized.

9. The structured mesh network of claim 1 wherein the connectivity logic contained by the structured mesh nodes realigns connections between the structured mesh nodes upon detection of an external network connection to form the connected configuration.

10. The structured mesh network of claim 9 wherein solely the isolated network root node searches for the external network connection and establishes said external network connection.

11. The structured mesh network of claim 10 wherein the uplink radio of the isolated network root node is used to connect to the external network.

12. The structured mesh network of claim 1 wherein a first mesh network in the isolated configuration comprises a first isolated root node and one or more first isolated children nodes and a second mesh network in the isolated configuration comprises a second isolated root node and at least one or more second isolated children nodes and at least one first isolated children node of the first mesh network establishes communication with a second isolated children node of the second mesh network, thereby triggering a realignment due to joining in both networks.

13. The structured mesh network of claim 12 wherein as part of the realignment due to joining one of the first and second isolated root nodes becomes an isolated network child node wherein the first or second isolated root node of the smaller of the first and second mesh networks becomes the isolated network child node.

14. The structured mesh network of claim 12 wherein as part of the realignment due to joining one of the first and second isolated root nodes becomes an isolated network child node wherein the selection of the new isolated root node is made on the basis of physical position and direction of travel of the two networks.

15. The structured mesh network of claim 1 wherein a first mesh network in the isolated configuration comprises a first isolated root node and one or more first isolated children nodes and a second mesh network in the isolated configuration comprises a second isolated root node and at least one or more second isolated children nodes and the first isolated root node of the first mesh network establishes communication with a second isolated child node of the second mesh network, thereby the first isolated root node of the first mesh network becomes another second isolated child node of the second mesh network.

16. The structured mesh network of claim 15 wherein the uplink radio on the first isolated root node of the first mesh network establishes communication with the second isolated child node of the second mesh network.

17. The structured mesh network of claim 16 wherein solely the first isolated root node of the first mesh network establishes communication with the second isolated child node of the second mesh network.

18. The structured mesh network of claim 1 wherein the DHCP server random address range is broadcast by the isolated network root node in a special information packet to other nodes when the isolated network root node is scanning to join said other nodes.

* * * * *